(12) United States Patent
Mitsui et al.

(10) Patent No.: US 7,780,200 B2
(45) Date of Patent: Aug. 24, 2010

(54) CONNECTING STRUCTURE FOR JOINT MEMBER

(75) Inventors: Kaichiro Mitsui, Tsukubamirai (JP); Kazuo Ogawa, Tsukubamirai (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/199,216

(22) Filed: Aug. 27, 2008

(65) Prior Publication Data

US 2009/0079188 A1    Mar. 26, 2009

(30) Foreign Application Priority Data

Sep. 21, 2007   (JP) ............... 2007-244608

(51) Int. Cl.
*F16L 39/00* (2006.01)
(52) U.S. Cl. ................. 285/124.1; 285/124.4
(58) Field of Classification Search .............. 285/124.5, 285/124.1, 124.4
See application file for complete search history.

(56) References Cited

U.S. PATENT DOCUMENTS

| | | | | |
|---|---|---|---|---|
| 3,538,940 | A * | 11/1970 | Graham | 285/125.1 |
| 3,560,027 | A * | 2/1971 | Graham | 285/130.1 |
| 4,269,075 | A * | 5/1981 | Crist et al. | 74/16 |
| 4,453,747 | A * | 6/1984 | Bimba | 285/305 |
| 6,568,713 | B1 * | 5/2003 | Bruvry et al. | 285/133.21 |
| 6,733,044 | B2 * | 5/2004 | Huang | 285/124.5 |
| 6,832,788 | B2 * | 12/2004 | Fukano et al. | 285/124.5 |

FOREIGN PATENT DOCUMENTS

| | | |
|---|---|---|
| DE | 1 525 454 | 6/1969 |
| GB | 1128356 | 9/1968 |
| JP | 51-28857 | 8/1976 |
| JP | 59-208283 | 11/1984 |
| JP | 5-503341 | 6/1993 |
| JP | 6-59022 | 8/1994 |
| JP | 8-75071 | 3/1996 |
| JP | 2003-269425 | 9/2003 |
| JP | 2003-301986 | 10/2003 |

\* cited by examiner

*Primary Examiner*—Aaron M Dunwoody
(74) *Attorney, Agent, or Firm*—Oblon, Spivak, McClelland, Maier & Neustadt, L.L.P.

(57) ABSTRACT

A connecting structure for a joint member is constituted by a joint member formed from a metal material and having a hexagonal shape in cross section, which is inserted into a first port of a valve body made from a resin material. A U-shaped clip is inserted into a clip hole that confronts the first port and engages with a pin groove, which is formed on an outer peripheral surface of the joint member. In accordance therewith, axial displacement of the joint member accommodated within the first port is regulated. Further, rotational displacement of the joint member with respect to the first port, which also is formed with a hexagonal shape in cross section, is regulated while the joint member is connected with respect to the first port.

8 Claims, 7 Drawing Sheets

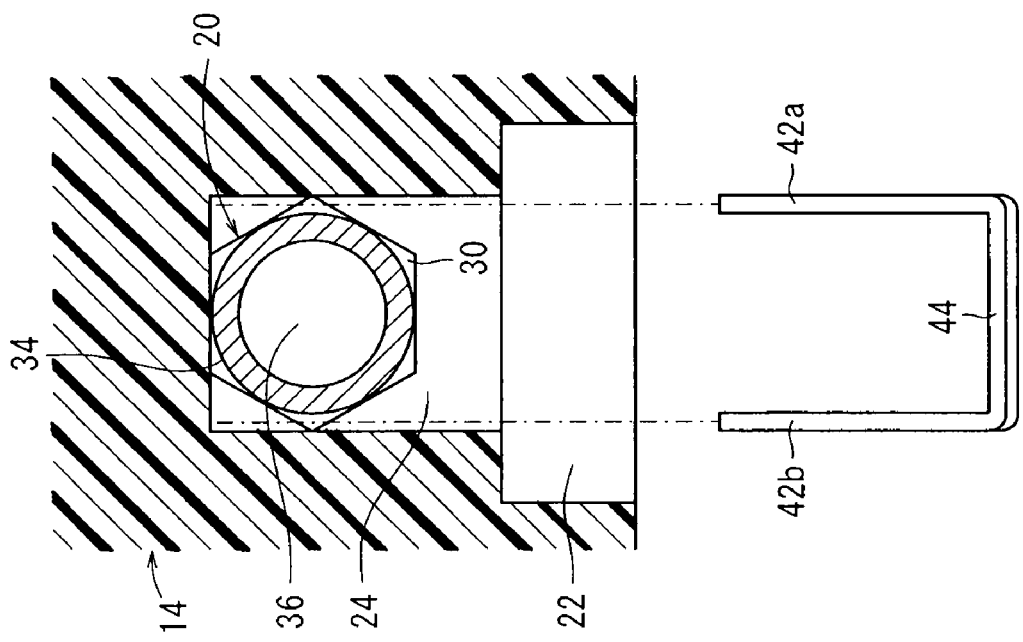
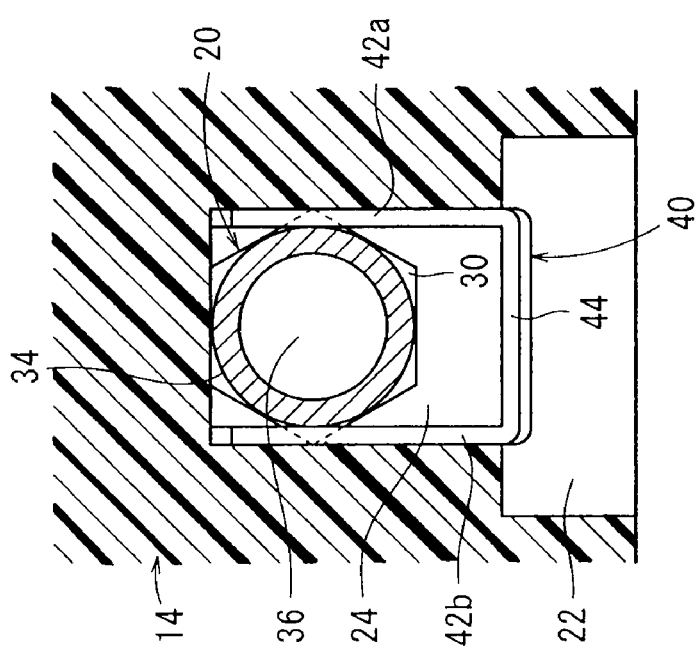

CONNECTING STRUCTURE FOR JOINT MEMBER

BACKGROUND OF THE INVENTION

1. Field of the Invention

The present invention relates to a connecting structure for a joint member, by which the joint member is detachably connected with respect to a fluid pressure device or the like.

2. Description of the Related Art

Heretofore, a valve that enables adjustment of a flow amount, a pressure, or the like, of a pressure fluid to desired values, or a fluid pressure device such as an ejector or the like for generating a negative pressure, have been known. In these types of fluid pressure devices, in general, the body portion thereof is formed from a resin material for the purpose of reducing the weight thereof. A joint member, through which a pressure fluid is supplied to or discharged from the body, is connected with respect to the body. Further, this type of joint member generally is formed from a metal material, due to reasons of strength, as well as to withstand the pressure of the pressure fluid that is supplied thereto.

However, in the case that such a joint member, which is formed from a metal material, is connected to the supply/discharge port of a body made from a resin material, although threaded engagement of the joint member to the supply/discharge port may be contemplated, in the event that the joint member is screwed with an excessive torque, there is a fear that damage to the body could result, and further, efforts to control or manage the screwing torque have proven to be difficult and complicated.

For this purpose, for avoiding damage to the body and the difficulty in managing torque, with the insert nut disclosed in Japanese Laid-Open Utility Model Publication No. 06-059022, when the body is formed from a resin material, a connecting method for fixing the joint member is employed, in which an insert molding is utilized and formed simultaneously with the joint member.

However, when the body is formed from a resin material, since it is required to perform a molding operation for installing the joint member onto the supply/discharge port, the assembly operation of the joint member at the time of molding is complicated. Owing thereto, a connecting structure for a joint member has been desired, which can enable a body formed from a resin material to be more easily and reliably connected to a joint member made from a metal material.

SUMMARY OF THE INVENTION

A general object of the present invention is to provide a connecting structure for a joint member, which enables the joint member to be connected reliably and easily with respect to a chassis formed from a resin material.

For achieving the aforementioned object, the present invention is characterized by a connecting structure for a joint member, which is connected to a chassis of a fluid pressure device, the chassis being formed from a resin material and equipped with a port through which a pressure fluid is supplied/discharged, the connecting structure comprising a joint member formed from a metal material and with a non-circular shape in cross section, and having an opening through which the pressure fluid flows, and a latching groove disposed on an outer peripheral surface and recessed with respect to the outer peripheral surface, and a latching member, which is inserted into an insertion hole of the chassis that faces the port, and which is inserted through the latching groove from a direction perpendicular to the axial direction of the joint member, wherein a cross sectional shape of the port into which the joint member is inserted also is formed in a non-circular shape corresponding to the cross sectional shape of the joint member.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7A shows a cross sectional view taken along line VIIA-VIIA of FIG. 5; and

FIG. 7B is an enlarged vertical cross sectional view showing a state prior to installation of the joint member and the clip of FIG. 7A.

DESCRIPTION OF THE PREFERRED EMBODIMENTS

A preferred embodiment concerning the connecting structure for a joint member according to the present invention shall be presented and described in detail with reference to the accompanying drawings.

Figure 1:
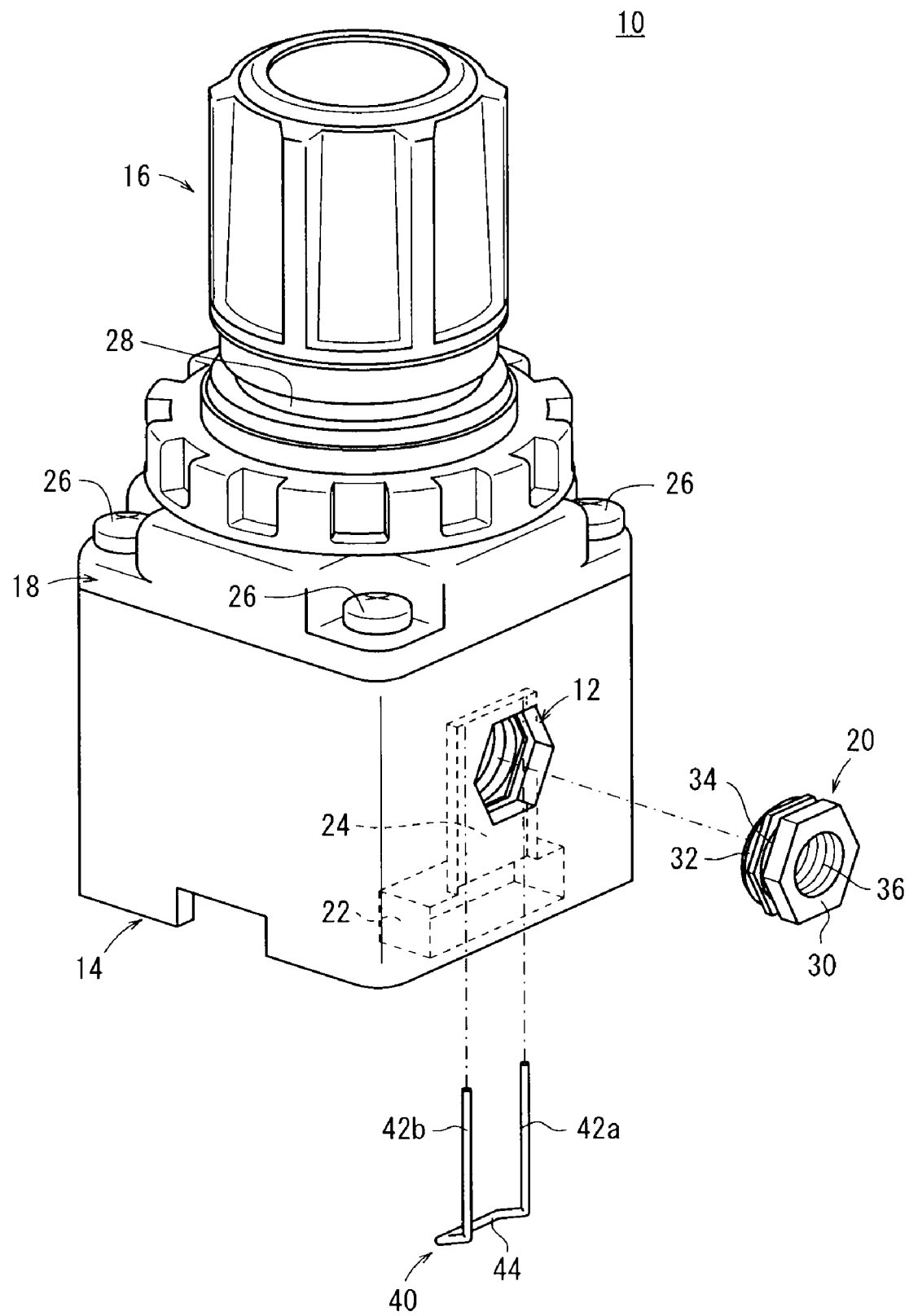
FIG. 1 is an exploded perspective view showing a state in which a joint member and a clip are detached in a pressure-reducing valve, to which a connecting structure for the joint member according to an embodiment of the present invention is applied.
Figure 2:
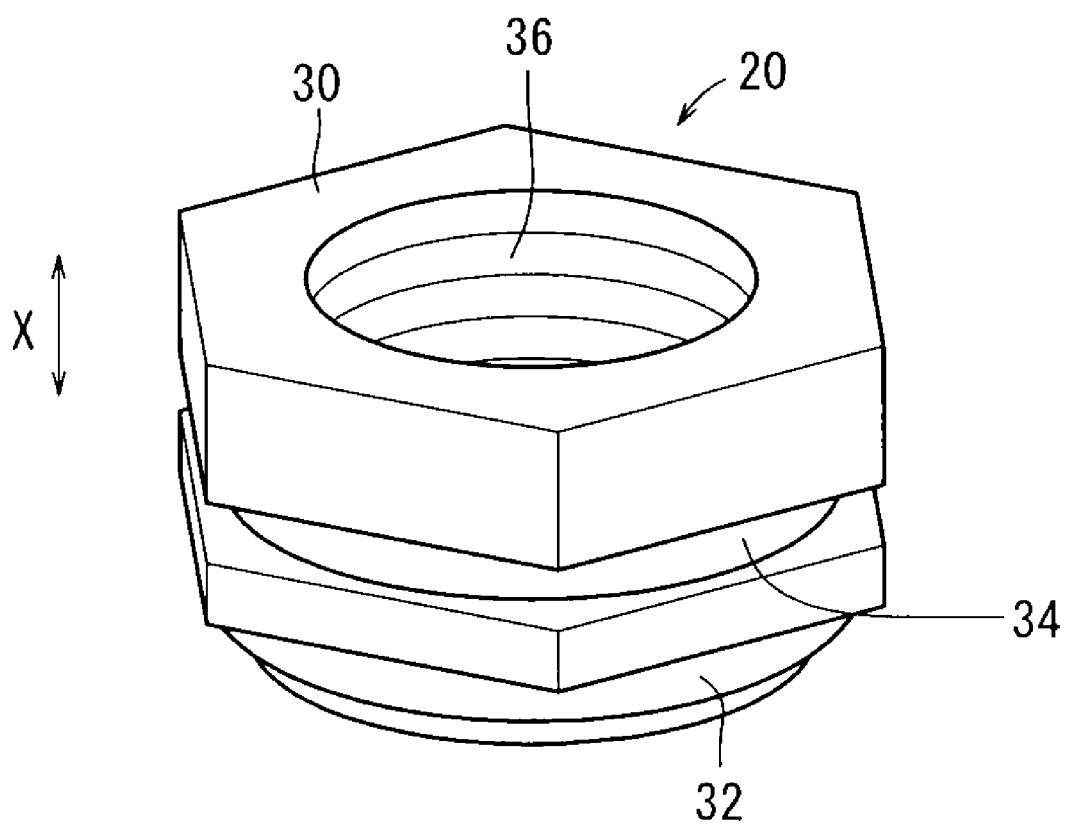
FIG. 2 is a stand-alone perspective view of the joint member shown in FIG. 1.
Figure 3:
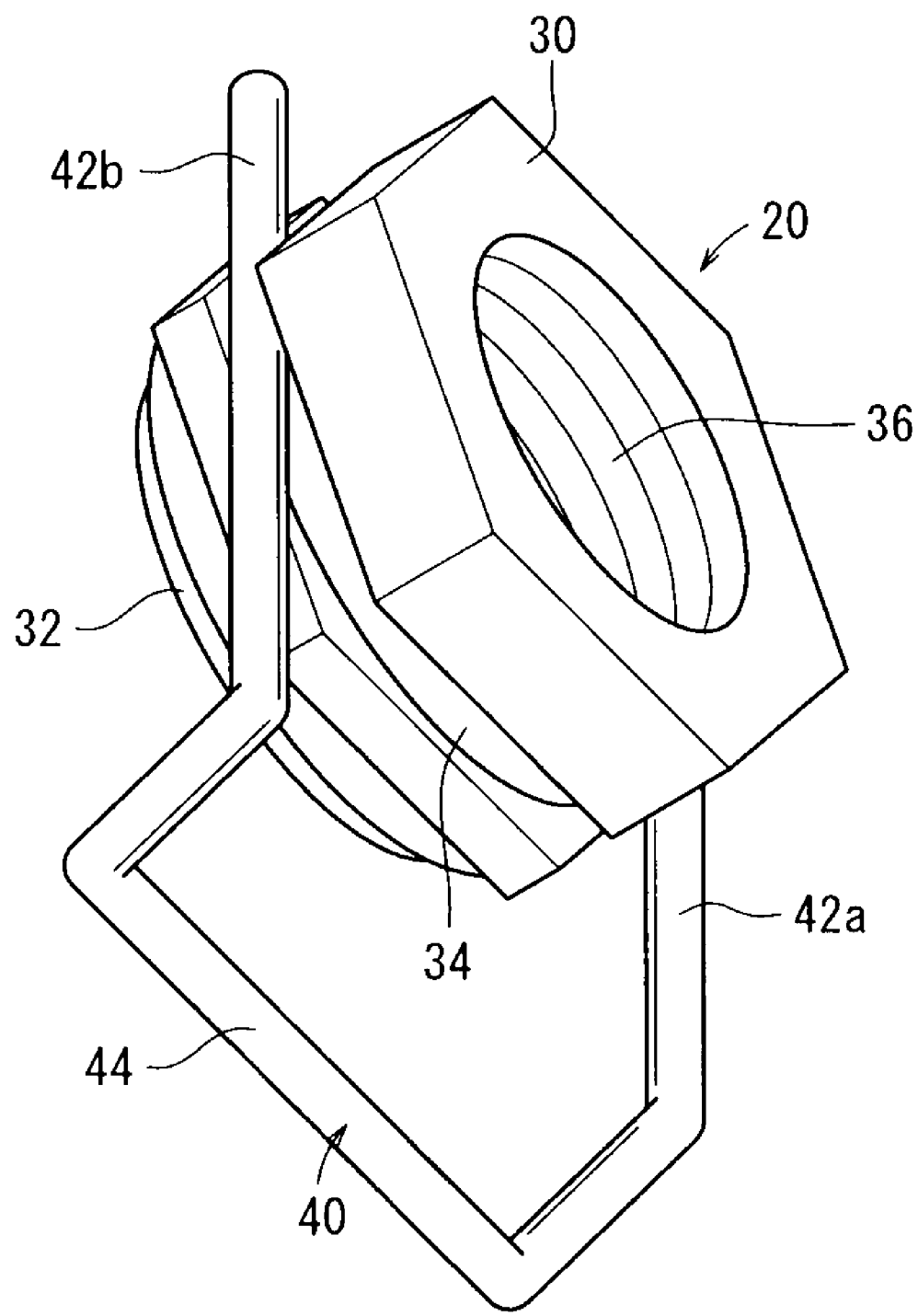
FIG. 3 is a perspective view showing a condition in which the clip is engaged with respect to the joint member of FIG. 2.
Figure 4:
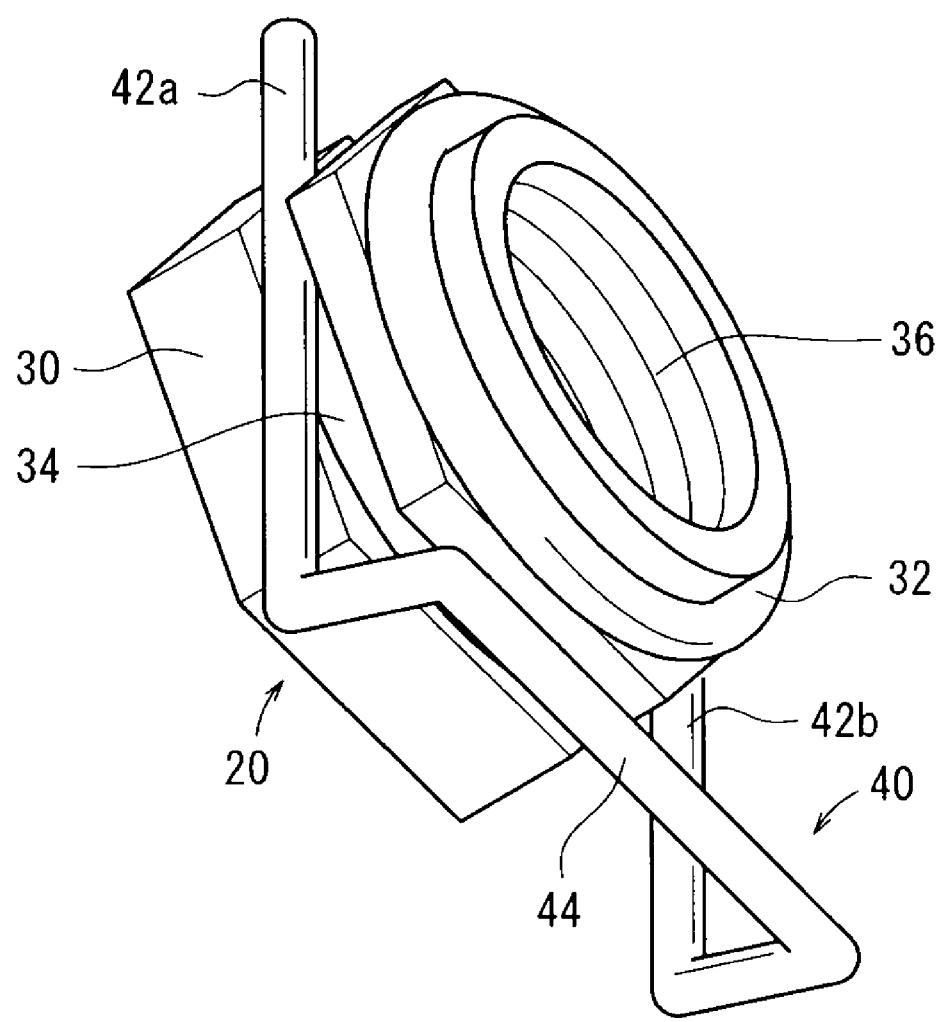
FIG. 4 is a perspective view of the joint member and the clip of FIG. 3, as viewed from a different direction.
Figure 5:
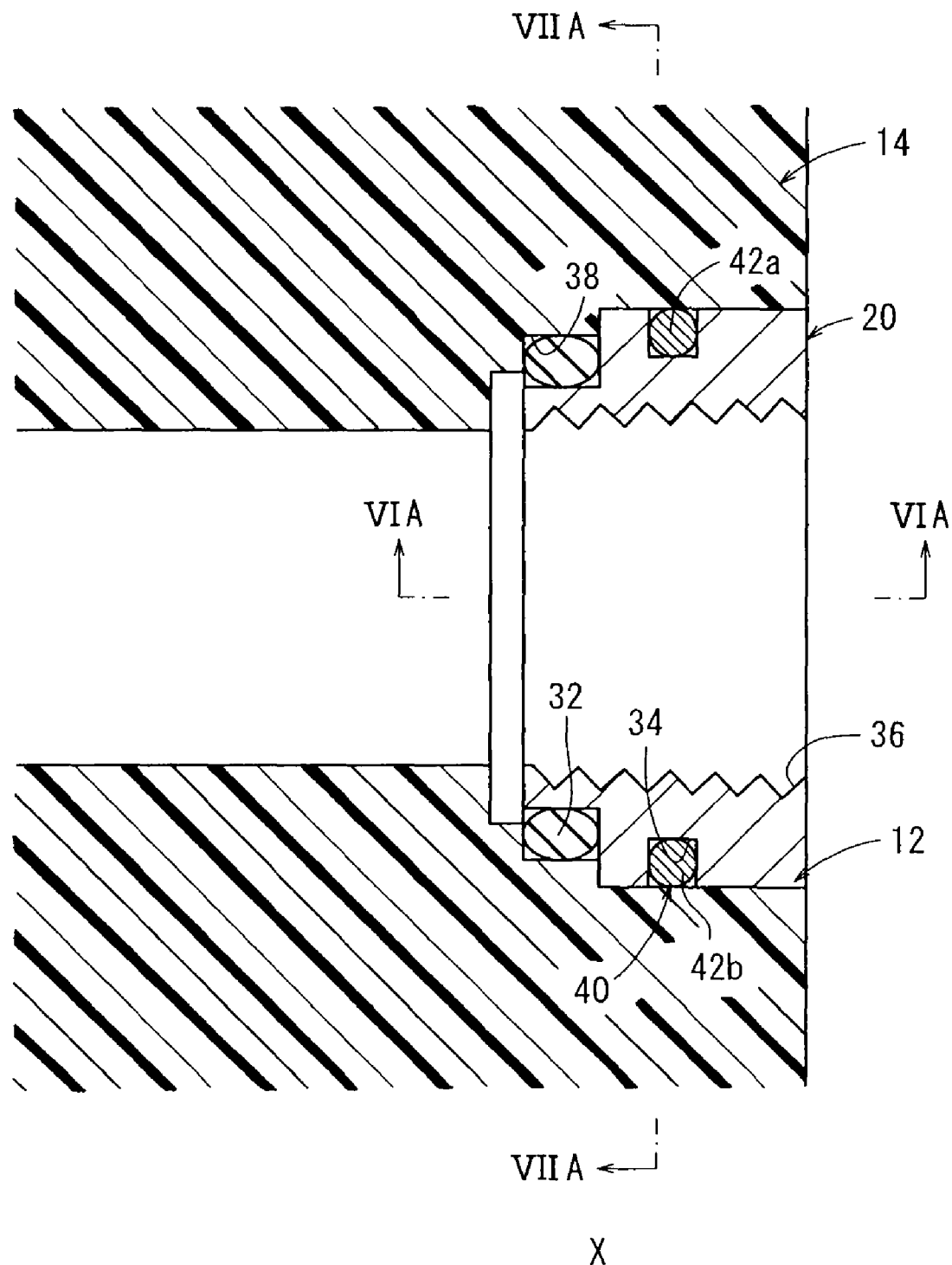
FIG. 5 is an enlarged lateral cross sectional view showing a state in which the joint member shown in FIG. 2 is installed onto a first port of a valve body.

In FIG. 1, reference numeral 10 indicates a pressure-reducing valve (fluid pressure device) to which the connecting structure for a joint member 20 according to the embodiment of the present invention is applied.

As shown in FIG. 1, the pressure-reducing valve 10 is made up from a valve body (chassis) 14 having a first port 12 and a second port (not shown) for supplying and discharging a pressure fluid, and a housing 18, which is equipped with an adjustment valve 16 disposed on an upper portion of the valve body 14, which enables the pressure of the pressure fluid to be set at a predetermined value.

The valve body 14 is formed in a block shape from a resin material, and includes the first port (port) 12 formed on one side surface through which the pressure fluid is supplied, and a second port formed on another side surface through which the pressure fluid is discharged. A non-illustrated communication chamber, by which the first port 12 and the second port communicate, is formed in the interior of the valve body 14. In addition, the pressure fluid that is supplied from the first port 12 flows to the second port while passing through the communication chamber. With the present invention, a condition shall be described in which the joint member 20 is installed with respect to the first port 12 constituting the valve body 14.

The first port 12 includes an opening having a hexagonal shape in cross section, wherein the joint member 20, which is capable of being connected to a pipe or the like, is installed inside of the first port 12.

Further, a recess 22, which is recessed upwardly by a predetermined height, is formed on the bottom surface side of the valve body 14. A clip hole (insertion hole) 24, which penetrates toward the side of the first port 12, is formed in the recess 22. The clip hole 24 is formed with an oblong shape in cross section, and extends along the vertical direction of the valve body 14. The clip hole 24 penetrates inside of the first port 12.

Concerning the clip hole 24, a depth thereof along the axial direction (in the direction of the arrow X) of the first port 12 is set substantially equal to the diameter of the pins 42a, 42b of the clip (latching member) 40 to be discussed later, whereas the width dimension thereof, which is substantially perpendicular to the aforementioned axial direction, is set to correspond to a width dimension of the clip 40, defined by the distance separating the pair of pins 42a, 42b.

A housing 18 is connected through a plurality of bolts 26 so as to cover an upper part of the valve body 14, and a bottomed cylindrical shaped adjustment valve 16 is rotatably disposed on a retaining member 28 that projects from the upper part. The adjustment valve 16 is connected to a shaft (not shown), which is disposed for displacement along the axial direction inside of the housing 18 and the valve body 14. The shaft is displaced by rotating the adjustment valve 16, for thereby adjusting the pressure fluid that flows through the interior of the communication chamber to a predetermined pressure value.

More specifically, the pressure fluid supplied to the interior of the valve body 14 through the first port 12 is adjusted to a predetermined pressure value by rotating the adjustment valve 16, and the pressure fluid is discharged to the outside from the second port (not shown) while passing through the non-illustrated communication chamber.

As shown in FIGS. 1 through 7, the joint member 20 is formed from a metal material and includes a base portion 30, which is hexagonal in cross section, formed on one end side thereof, a seal member 32 disposed on the other end side and which is mounted adjacent to the base portion 30, and a pin groove (latching groove) 34, which is formed by an outer peripheral surface of the base portion 30 being recessed in an annular shape.

The base portion 30 is formed with a shape corresponding to the shape of the inner wall surface of the first port 12, which also is formed with a hexagonal shape in cross section, such that when the joint member 20 is inserted into the first port 12, it is accommodated in a state having a slight clearance between the outer peripheral surface of the base portion 30 and the inner wall surface of the first port 12.

On the other hand, a connection hole (opening) 36, to which a non-illustrated pipe, a measuring instrument or the like may be connected, penetrates through an inner portion of the joint member 20. The connection hole 36 is formed along the axial direction (the direction of the arrow X in FIG. 5) of the joint member 20, and includes threads engraved on the inner circumferential surface thereof, with which the pipe, measuring instrument or the like is screw-engaged.

Further, the length along the axial direction of the joint member 20 is set substantially the same as the depth of the first port 12, such that when the joint member 20 is inserted into the first port 12, the pin groove 34 is arranged to confront the clip hole 24, together with the seal member 32 being disposed on an annular shaped small diameter part 38 of the first port 12, while abutting against the inner wall surface thereof. More specifically, by setting the length of the joint member 20 and the depth of the first port 12 to be substantially equal to each other, the joint member 20 does not project outwardly from the side surface of the valve body 14 when the joint member 20 is installed in the first port 12.

In the above explanation, a case has been described in which the joint member 20 is formed with a hexagonal shape in cross section. However, the invention is not limited to this configuration, and the joint member 20 may also be formed, for example, with a rectangular shape in cross section. That is, the joint member 20 may be formed with any polygonal shape in cross section having at least three or more angles, and with a cross sectional shape corresponding to the shape of the first port 12 in which the joint member 20 is installed. Owing thereto, rotational displacement of the joint member 20, which is inserted into the first port 12, is reliably regulated.

The clip 40 is formed from a metal material with a U-shape in cross section, and includes a pair of pins 42a, 42b, and a connecting section 44 that interconnects each of the two pins 42a, 42b. The pins 42a, 42b are substantially parallel to one another while being separated by a predetermined interval. End parts at one end of the pins 42a, 42b are connected by the connecting section 44, whereas the other end parts thereof are in a state of being separated from each other by the predetermined interval. The distance by which the pair of pins 42a, 42b is separated is set to correspond to the outer diameter along the circumference of the pin groove 34 formed in the joint member 20.

Further, on one end side thereof, the pins 42a, 42b are bent respectively at a predetermined angle with respect to the other end side, and the bent end parts thereof are connected together by the connecting section 44. The bent ends of the pins 42a, 42b are bent, for example, at about 45° angle with respect to the other ends of the pins 42a, 42b.

In addition, the clip 40 is inserted, with the pins 42a, 42b oriented upwardly, into the clip hole 24 from the side of the recess 22 of the valve body 14, whereupon the pins 42a, 42b are inserted respectively through the pin groove 34 of the joint member 20 that is inserted through the first port 12. As a result, displacement of the joint member 20 within the first port 12 in the axial direction (the direction of the arrow X in FIG. 5) is regulated, and the joint member 20 is prevented from falling out from the first port 12.

Further, because the joint member 20, which is formed with a hexagonal shape in cross section, is installed in the first port 12, which similarly is formed with a hexagonal shape in cross section, displacement in a rotational direction also is regulated. As a result, the joint member 20 is fixed reliably and strongly with respect to the first port 12 of the valve body 14, which is made from a resin material.

The connecting structure for the joint member 20 according to the embodiment of the present invention basically is constructed as described above. Next, an explanation shall be made concerning a method for assembling the joint member 20.

Figure 6A:
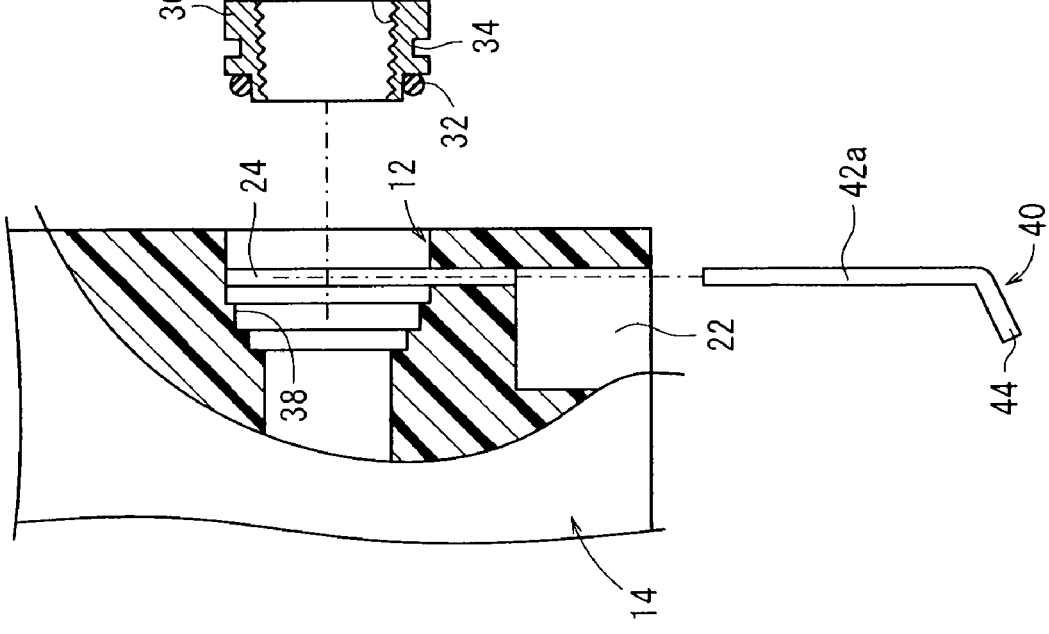
FIG. 6A shows a cross sectional view taken along line VIA-VIA of FIG. 5.
Figure 6B:
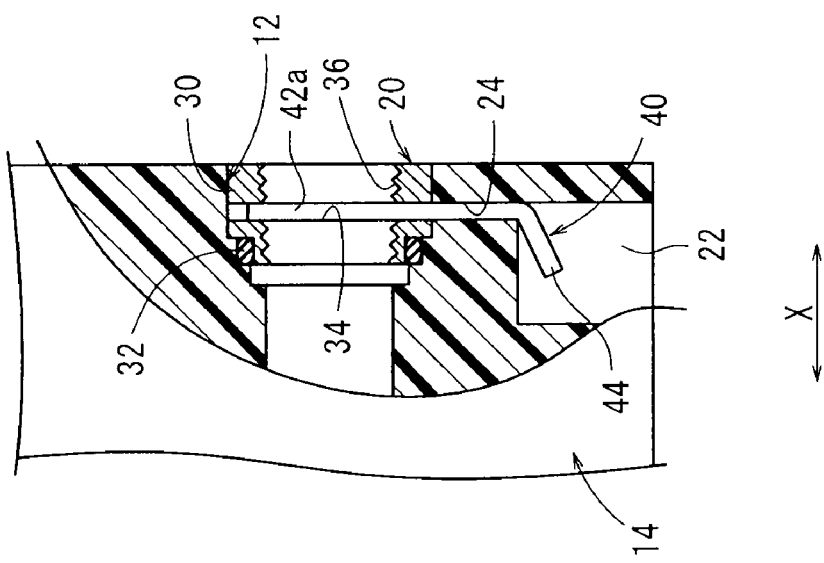
FIG. 6B is an enlarged vertical cross sectional view showing a state prior to installation of the joint member and the clip of FIG. 6A.

At first, as shown in FIGS. 6B and 7B, the joint member 20 is moved to a position facing the first port 12 of the valve body 14 constituting the pressure-reducing valve 10, and the joint member 20 is inserted into the first port 12 from the other end side thereof on which the seal member 32 is mounted. At this time, the outer peripheral surface of the joint member 20, which is formed with a hexagonal shape in cross section, is inserted so as to match with the inner wall surface shape of the first port 12, which also is formed with a hexagonal shape in cross section. Specifically, through insertion of the joint member 20 into the first port 12, which is formed with a hexagonal shape in cross section, rotational displacement thereof is regulated, and the joint member 20 is positioned in its rotational orientation.

Further, the seal member 32 abuts against the small diameter part 38 of the first port 12, whereby an airtight condition between the first port 12 and the joint member 20 is maintained, and the pin groove 34 is arranged at a position confronting the clip hole 24. In this case, the joint member 20 is accommodated completely inside the interior of the first port 12, and the end surface of the joint member 20 does not project outwardly with respect to the side surface of the valve body 14.

Next, the connecting section 44 of the clip 40 is gripped so that the pins 42a, 42b are directed toward the side of the valve body 14, and the clip 40 is inserted toward the side of the clip hole 24 from the recess 22, which is disposed on the bottom surface of the valve body 14. Consequently, the two pins 42a, 42b are inserted respectively through the pin groove 34 of the joint member 20 that faces the clip hole 24, and the clip 40 is retained inside the clip hole 24 (see FIGS. 7A and 7B). At this time, the connecting section 44 constituting the clip 40 is exposed on an outside portion of the clip hole 24 and is accommodated inside the recess 22.

Additionally, displacement of the joint member 20 along the axial direction (the direction of the arrow X) inside the first port 12 is regulated by engagement of the clip 40, which is inserted through the pin groove 34 formed midway through the base portion 30 of the joint member 20, whereby the joint member 20 is retained inside the first port 12. As a result, the joint member 20 is reliably and strongly fixed in place through the first port 12 onto a side surface of the valve body 14 constituting the pressure-reducing valve 10.

On the other hand, in the case that the joint member 20 is to be withdrawn from the first port 12, the connecting section 44 of the clip 40 that is accommodated inside the recess 22 is gripped, and is pulled in a direction to separate away from the valve body 14, whereby the pins 42a, 42b are taken out from the clip hole 24. At this time, because the one end side of the clip 40 is bent with respect to the other end side thereof having the pins 42a, 42b thereon, gripping of the clip 40 can be carried out suitably and easily.

In addition, by pulling out the clip 40 from the clip hole 24, because the displacement-regulated state of the joint member 20 in the axial direction (the direction of the arrow X) with respect to the first port 12 is released, the joint member 20 can be separated from the first port 12 and taken out therefrom.

In the foregoing manner, with the present embodiment, after the joint member 20 has been inserted with respect to the valve body 14 of the pressure-reducing valve 10 that forms the chassis, the pins 42a, 42b of the clip 40 are inserted while passing through the pin groove 34 of the joint member 20. Additionally, by insertion of the pins 42a, 42b of the clip 40 through the pin groove 34, displacement of the joint member 20 in the axial direction (the direction of the arrow X) inside of the first port 12 is prevented, and moreover, rotational displacement by insertion thereof into the first port 12, which is formed with a hexagonal shape in cross section, also is prevented. As a result, with the simple operations described above, the joint member 20, which is formed from a metal material, can reliably be connected with respect to the first port 12 of the valve body 14, which is made of a resin material, and the joint member 20 can be positioned in a highly accurate state with respect to the first port 12.

Further, because connection beforehand of the joint member 20, which is formed from a metal material, by means of insert molding is unnecessary with respect to the first port 12 of the valve body 14 that is made from a resin material, compared to the case in which insert molding is carried out as in the conventional art, such a molding process can be dispensed with, thereby improving productivity.

Furthermore, when the joint member 20 is connected to the valve body 14, due to the fact that after the joint member 20 has been inserted into the first port 12, the joint member 20 is fixed by engagement of the clip 40, in comparison with the connection structure of the conventional art in which the joint member 20 is screw-engaged with respect to the chassis with a predetermined tightening torque, management of the tightening torque required during connection thereof becomes unnecessary, and the number of attachment process steps needed upon attachment of the joint member 20 can be reduced, and operational efficiency can be improved.

Still further, damage or the like is not caused when the joint member is threaded at an excessive torque with respect to the chassis, as was feared with the conventional connecting structure, and the durability of the valve body 14, which is made from a resin material and has the joint member 20 connected thereto, can be improved.

Further, for example, in the event that a pressure gauge is connected to the joint member 20, in order to determine the rotational positioning of the joint member 20 with respect to the first port 12, by connecting the pressure gauge beforehand at a desired position with respect to the joint member 20, when the joint member 20 is connected to the valve body 14, the pressure gauge can be confirmed visually at an optimal position. Furthermore, because the joint member 20 is formed with a hexagonal shape in cross section, the joint member 20 is capable of being connected easily at varied attachment angles corresponding, for example, to conditions of use of the aforementioned pressure gauge or the like. More specifically, the clip 40 is simply separated from a state in which the joint member 20 is connected to the valve body 14, and after the joint member 20 has been rotated by a predetermined angle, the joint member 20 is reinserted into the first port 12. Thus, the joint member 20 is once again fixed by engagement of the clip 40.

The connecting structure for a joint member according to the present invention is not limited to the above-described embodiment, and various other structures and features may be adopted as a matter of course without deviating from the essential gist of the present invention.

What is claimed is:

1. A fluid pressure device comprising:
a chassis being formed from a resin material including a port through which a pressure fluid is supplied/discharged;
an adjustment valve mounted on a surface of the chassis to set a pressure of the pressure fluid;
a joint member formed from a metal material having a non-circular shape in cross section, and including an opening through which the pressure fluid flows, and a latching groove disposed on an outer peripheral surface of the joint member and recessed with respect to the outer peripheral surface; and
a latching member inserted into an insertion hole that is formed on a bottom surface of the chassis and that faces the port, the latching member being inserted through the latching groove of the joint member from a direction perpendicular to an axial direction of the joint member, and the bottom surface being a surface opposite to the surface on which the adjustment valve is mounted, wherein a cross sectional shape of the port into which the joint member is inserted is also formed in a non-circular shape, corresponding to the cross sectional shape of the joint member.

2. The fluid pressure device according to claim 1, wherein the latching member is formed substantially in a U-shape in cross section, and comprises a pair of pins, and a connecting section that connects end portions of each of the pair of pins.

3. The fluid pressure device according to claim 2, wherein the pins are retained through the connecting section while being separated at a predetermined distance, and the pins engage respectively with the latching groove of the joint member inside the insertion hole.

4. The fluid pressure device according to claim 3, wherein in the latching member, ends of the pins on a side of the connecting section are bent respectively at a predetermined angle.

5. The fluid pressure device according to claim 1, wherein the joint member and the port are formed in hexagonal or rectangular shapes in cross section.

6. The fluid pressure device according to claim 3, wherein a recess is formed in the chassis, which communicates with the insertion hole and in which the connecting section of the latching member is accommodated.

7. The fluid pressure device according to claim 1, wherein, when the joint member is installed in the port, the latching groove of the joint member is positioned to confront the insertion hole.

8. A fluid pressure device comprising:
a chassis being formed from a resin material including a port through which a pressure fluid is supplied/discharged;
an adjustment valve mounted on a surface of the chassis to set a pressure of the pressure fluid;
a joint member formed from a metal material having a non-circular shape in cross section, and including an opening through which the pressure fluid flows, and a latching groove disposed on an outer peripheral surface of the joint member and recessed with respect to the outer peripheral surface; and
a latching member inserted into an insertion hole, that is formed on a bottom surface of the chassis and that faces the port, the latching member being inserted through the latching groove of the joint member from a direction perpendicular to an axial direction of the joint member, and the bottom surface being a surface opposite to the surface on which the adjustment valve is mounted,
wherein a cross sectional shape of the port into which the joint member is inserted is also formed in a non-circular shape, corresponding to the cross sectional shape of the joint member, and
the latching member includes,
a connecting section which connects first end parts at one end of two pins of the latching member, the two pins being substantially parallel to each other separated by a predetermined interval, and
second end parts at another end of the two pins being separated from each other by the predetermined interval, the first end parts of the two pins being bent at an angle of 45° with respect to a plane including the second end parts of the two pins.

* * * * *